United States Patent
Lim et al.

(10) Patent No.: US 9,556,904 B2
(45) Date of Patent: Jan. 31, 2017

(54) SINTERED BUSH

(75) Inventors: Dong Pil Lim, Gyeonggi-do (KR); Sang Beom Kim, Seoul (KR); Dong Seob Shim, Gyeonggi-do (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 708 days.

(21) Appl. No.: 13/140,525

(22) PCT Filed: Dec. 17, 2009

(86) PCT No.: PCT/KR2009/007573
§ 371 (c)(1),
(2), (4) Date: Jun. 17, 2011

(87) PCT Pub. No.: WO2010/071373
PCT Pub. Date: Jun. 24, 2010

(65) Prior Publication Data
US 2011/0249923 A1 Oct. 13, 2011

(30) Foreign Application Priority Data
Dec. 19, 2008 (KR) .................. 10-2008-0130199

(51) Int. Cl.
| F16C 33/12 | (2006.01) |
| F16C 33/10 | (2006.01) |
| F16C 33/14 | (2006.01) |

(52) U.S. Cl.
CPC ............ *F16C 33/12* (2013.01); *F16C 33/102* (2013.01); *F16C 33/128* (2013.01); *F16C 33/14* (2013.01); *F16C 33/145* (2013.01); *F16C 33/104* (2013.01); *F16C 2204/12* (2013.01); *F16C 2204/60* (2013.01); *F16C 2208/58* (2013.01)

(58) Field of Classification Search
CPC .............................. B22F 298/00; C22C 29/06
USPC ..................................................... 75/246, 239
See application file for complete search history.

(56) References Cited

U.S. PATENT DOCUMENTS

| 4,758,272 | A | * | 7/1988 | Pierotti et al. ................. 75/246 |
| 4,904,399 | A | | 2/1990 | Waynick |
| 5,941,646 | A | | 8/1999 | Mori et al. |
| 2001/0036328 | A1 | | 11/2001 | Yamamoto et al. |
| 2004/0244521 | A1 | * | 12/2004 | Russ et al. ...................... 74/425 |
| 2005/0175492 | A1 | * | 8/2005 | Hirooka et al. ............. 417/902 |

(Continued)

FOREIGN PATENT DOCUMENTS

| CN | 1106900 A | 8/1995 |
| CN | 1422939 A | 6/2003 |

(Continued)

OTHER PUBLICATIONS

International Search Report: mailed Jul. 22, 2010; Appln. PCT/KR2009/007573.

*Primary Examiner* — Jessee Roe
*Assistant Examiner* — Jenny Wu
(74) *Attorney, Agent, or Firm* — Ladas & Parry LLP (57) ABSTRACT

Provided is a sintered bush including a porous metallic sintered body including: a iron (Fe) based matrix containing a martensite structure; and one or more kind of metal matrix selected from copper (Cu), tin (Sn), and nickel (Ni), in which a lubricant which has oil separation of 5 to 10% at an operational temperature of 60 to 80° C. and is semisolid or solid at room temperature is impregnated in pores of the porous sintered body.

10 Claims, 4 Drawing Sheets

(56) References Cited

U.S. PATENT DOCUMENTS

2008/0167208 A1\* 7/2008 Hashida et al. ............. 508/582
2012/0177528 A1\* 7/2012 Takayama ...................... 419/38

FOREIGN PATENT DOCUMENTS

| EP | 0 942 063 A1 | 9/1999 |
|---|---|---|
| JP | 08-105444 A | 4/1996 |
| JP | 10-140206 A | 5/1998 |
| JP | 2004-533543 A | 11/2004 |
| JP | 2007002213 A \* | 1/2007 |
| JP | 2008297370 A \* | 12/2008 |
| KR | 10-0512386 B1 | 9/2005 |
| KR | 10-0790003 B1 | 12/2007 |
| KR | 10-0790003 B1 | 1/2008 |
| WO | 03/004711 A1 | 1/2003 |

\* cited by examiner

SINTERED BUSH

TECHNICAL FIELD

The present invention relates to a sintered bush that can be used at a low speed and under a high contact pressure in construction equipments and the like.

BACKGROUND ART

A construction equipment, such as an excavator, a skid steer loader and the like, includes a plurality of joints, for example, a connection part of a boom and an arm, a connection part of an arm and a bucket, and the like. The joints are configured by a pin connecting two members in a place where joint motion is generally required and a bush for reducing frictional resistance between the pin and a pin hole, and the pin and the bush are fluctuated in a lubricative environment. In addition, the joints are further configured by a housing that supports the pin and the bush, a seal for preventing contaminants, and the like.

Joints operate under various conditions depending on connection types, working conditions, and the types of joints, and in general, operate under a contact pressure of about 2 to 6 kg/mm$^2$ and at a velocity of about 2 to 5 cm/sec. In particular, in operation an instantaneous contact pressure can reach three or more times of a general contact pressure due to an asymmetric load depending on operational conditions. Since the bush used at a low speed and under a high contact pressure requires high scuffing resistance and abrasion resistance, various compositions and forms of products have been developed.

For example, there have been provided bushes formed of a porous iron-based sintered material. In this case, a lubricant having viscosity of about 240 to 1500 cSt is impregnated in the pores of the bush. In the case of this type of bushes, a temperature increases due to frictional heat of a shaft and the inner periphery of the bush in use, and as a result the volume of the impregnated lubricant increases and the viscosity decreases so that the lubricant escapes. Meanwhile, when the bush is not operated, a capillary force increases due to the increase in the viscosity of the lubricant by cooling, and as a result the lubricant is restored into the pores. With the repetition of this reversible process, the bush was intended to maintain the lubricative state of the inner periphery. However, when the load in the lubricative region increases, the speed is reduced, or the viscosity of the lubricant decreases, the thickness of the oil film becomes small and thus the inner periphery of the bush is changed into a boundary lubrication state. Therefore, there are generated metal contact friction and adhesion due to the metal contact friction, and thus sufficient sliding effect could not be ensured under the high contact pressure.

In addition, in the related art, there have been used bushes impregnated with the lubricant to which S-based and P-based extreme pressure additives are added. However, this type of bush can only be used under a contact pressure of about 8 kg/mm$^2$, with limited application.

In order to solve the problem, in the related art, there have also been used bushes impregnated with the lubricant to which a general extreme pressure additive and various solid lubricative particles such as graphite, MoS$_2$, cubic BN and the like, are added.

However, in some cases, a general construction equipment does not regularly operate for several hours or more depending on the operation circumstance. When the construction equipment is not operated for several hours, the solid lubricative particles dispersed in the lubricant of the inside of the pores of the bush are precipitated and cohered. In this case, when a size of the cohered solid lubricative particles becomes several tens μm to several hundreds μm, which is a general pore size, or larger, the pores may be closed by the cohered solid lubricative particles of several tens μm to several hundreds μm or larger, or a capillary tube is closed, and the lubricant in the pores cannot escape to the inner periphery of the bush even when a temperature of the inner periphery of the bush increases after the construction equipment resumes operation. As such, an oil film is not well formed in the inner periphery of the bush and the sufficient lubricative effect is not obtained.

Instead of the bush using the lubricant having the above-mentioned problems, development of the bush using a new lubricant has been required.

Technical Problem

In a semisolid or solid lubricant at room temperature impregnated in the inside of pores of a porous metallic sintered body bush, by controlling oil separation of the lubricant at a predetermined operational temperature by a predetermined value, a sufficient sliding effect can be obtained in the inner periphery of the bush at the time of the working machine being operated, thereby minimizing lifespan deterioration of the sintered bush. The present invention is based on this concept.

Technical Solution

The present invention provides a sintered bush including a porous metallic sintered body including: an iron (Fe) based matrix having a martensite structure; and one or more kind of metal matrix selected from copper (Cu), tin (Sn), and nickel (Ni), in which a lubricant is impregnated in pores of the porous sintered body, and in which the lubricant has oil separation rate of 5 to 10% at an operational temperature of 60 to 80° C. and is semisolid or solid at room temperature.

Further, the present invention provides a sintered bush including a porous metallic sintered body including: a iron (Fe) based matrix having a martensite structure; and one or more kind of metal matrix selected from copper (Cu), tin (Sn), and nickel (Ni), in which a lubricant is impregnated in pores of the porous sintered body, and in which the lubricant has oil separation rate of 2% or less at an operational temperature of 40° C. or more to less than 60° C. and is semisolid or solid at room temperature.

Advantageous Effects

In the porous metallic sintered body according to the present invention, since a lubricant which has the oil separation rate adjusted to 5 to 10% at the operational temperature of 60 to 80° C. and is semisolid or solid at room temperature is impregnated in the pores of the porous metallic sintered body bush, the lubrication state is continuously maintained in the inner periphery of the bush at the time of the working machine being operated, such that the sufficient sliding characteristic can be obtained even at the low speed and under the high contact pressure. In addition, since the solid lubricative particles are not precipitated at room temperature during the time the working machine is stopped, a lubricative action can be smoothly obtained at the time of the working machine being operated.

<Explanation of Main Reference Numerals and Symbols>

| | |
|---|---|
| 1: Bush | 2: Pin |
| 3: O-ring | 4: Dust seal |
| 5: Anti-abrasion disk | 6: Feeding hole |
| 10: Lubricant | 11: Pore |
| 12: Iron (Fe) based matrix | 13: Metal matrix |

EMBODIMENTS

Hereinafter, the present invention will be described in detail.

Oil separation rate herein is measured in accordance with KS M 2050.

In a bush formed of a porous metallic sintered body according to the present invention, a lubricant which has oil separation rate of 5 to 10% at an operational temperature of 60 to 80° C. and is semisolid or solid at room temperature is impregnated in pores of the porous metallic sintered body.

In the related art, in order to obtain sufficient sliding effect at a low speed and under a high contact pressure, there has been used liquid lubricant added with solid lubricative particles to be impregnated in the pores of the porous metallic sintered body. However, in the case of the liquid lubricant added with solid lubricative particles, when a working machine stops operation for a long time, the solid lubricative particles dispersed in the lubricant in the pores are precipitated and cohered to close the pores and as a result, the lubricant does not escape to an inner periphery of the bush and an oil film is not well formed in the inner periphery of the bush, so that lubricative effect is not obtained.

Accordingly, in the related art, there have been attempts to use the semisolid or the solid lubricant at room temperature instead of the liquid lubricant, so the solid lubricative particles were prevented from being precipitated at room temperature or during the time the working machine is stopped, and frictional resistance was reduced by forming a sufficient oil film in the inner periphery of the bush even under the low speed and the high contact pressure.

However, in this case, the oil separation rate at a respective temperature of the lubricant impregnated in the pores of the porous metallic sintered body bush was not considered. Particularly, in the case of the above-described lubricant, since the oil separation rate at a working temperature, for example, the operational temperature of 60 to 80° C. was too low, a base oil was not well separated from the lubricant in working, such that the sliding effect was not well obtained at the low speed and under the high contact pressure condition, or since the oil separation rate was too high, the base oil was excessively separated from the lubricant in working, such that the base oil leaked and as a result, the lifespan of the bush was deteriorated.

Accordingly, in the present invention, since the lubricant which has the oil separation rate adjusted to 5 to 10% at the operational temperature of 60 to 80° C. and is semisolid or solid at room temperature is impregnated in the pores of the porous metallic sintered body bush, the lubrication state can be properly maintained in the inner periphery of the sintered bush even under the low speed and high contact pressure condition at the time of the working machine being operated, thereby reducing abrasion and damage of the sintered bush and improving the lifespan of the sintered bush.

In detail, when the inner periphery temperature of the sintered bush increases to the operational temperature, that is, about 60 to 80° C. with the working machine being operated, since the lubricant according to the present invention, which is impregnated in the pores of the sintered bush and is semisolid or solid at room temperature, is liquefied at the operational temperature of 60 to 80° C. and the base oil of about 5 to 10% is separated from the lubricant, flowability of the lubricant is improved and the base oil escapes to the inner periphery of the sintered bush together with a part of the solid lubricative particles. In this case, the oil film is formed on the inner periphery of the sintered bush due to the base oil that escaped, and thus the formed oil film produces sufficient sliding effect in the interface between a pin and the bush, and as a result frictional resistance between the pin and the bush can be reduced. Accordingly, in the sintered bush according to the present invention, there is no deterioration of the lifespan caused by abrasion.

In addition, when the sintered bush continuously operates with the working machine being operated for a long time, frictional heat due to continuous and repeated friction is generated in the contact region of the pin and the bush and a temperature of the contact region of the pin and the bush gradually increases due to the frictional heat. Thereafter, when the temperature of the contact region gets over an acceptable temperature, that is, over a galling temperature, the abrasion of the sintered bush is sped-up. However, in the lubricant according to the present invention which is semisolid or solid at room temperature, the frictional heat generated in the contact region is attenuated, and as a result scuffing resistibility of the sintered bush can be improved even when a lot of frictional heat is generated in the contact region of the pin and the bush in a phase transition process since the frictional heat is absorbed as latent heat.

Further, in case of the working machine operating under a condition with limited efficiency of the lubricant, for example, at a low temperature of 0° C. or less, in the lubricant used in the present invention which is semisolid or solid at room temperature, when the wax component rapidly expands at a certain temperature, the base oil absorbed (contained) in the wax is also swollen, such that a temperature range in which coefficient of thermal expansion is remarkably large ($0.1 \times 10^{-2}$/° C. to $10.0 \times 10^{-2}$/° C.) may exist in a used temperature range (−40 to 80° C.) as compared with a general liquid lubricant having coefficient of thermal expansion of $0.6 \times 10^{-3}$/° C. to $0.9 \times 10^{-3}$/° C. Accordingly, the lubricant used in the present invention largely expands by only a local temperature increase of a contact surface in an initial operation even when the working machine operates at the low temperature, and thus the lubricant impregnated in the pores rapidly escapes to the outside, thereby preventing the abrasion of the bush due to the friction between the pin and the bush.

The bush according to the present invention is formed of the porous metallic sintered body. In general, since pores are formed in the porous metallic sintered body, load bearing capacity is low as compared with a non-porous metallic sintered body. However, although the metallic sintered body is material having large thermal conductivity, it has a temperature difference between the surface layer directly contacting the pin when the bush is operated and the remaining region. As a result, in the case of the sintered bush of the present invention in which a semisolid or solid lubricant at room temperature is impregnated in the pores, among the semisolid or solid lubricant impregnated in the pores of the porous metallic sintered body, only the lubricant in the pores of the surface layer directly contacting the pin is converted into a liquid state and the lubricant in the inner pores in the other regions of the bush is maintained in the semisolid or solid state. Therefore, although the bush of the present invention is formed of the porous metallic sintered body, since the semisolid or solid lubricant is impregnated in the pores, the load bearing capacity can be improved as compared with a traditional bush formed of a general porous metallic sintered body.

Figure 3:
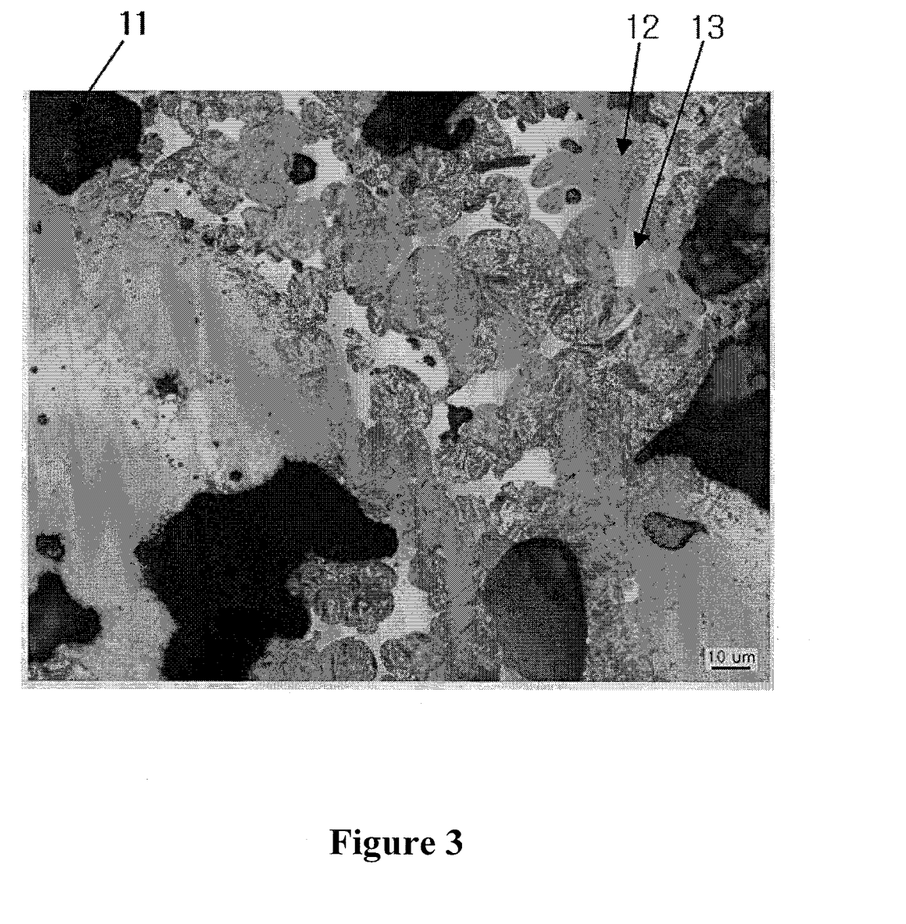
FIG. 3 is an optical microscopic photograph illustrating a cross section of a sintered bush according to an exemplary embodiment of the present invention.

The porous metallic sintered body of the present invention includes an iron based matrix 12 partially or entirely having a martensite structure and one or more kind of metal matrix 13 of copper (Cu), tin (Sn), and nickel (Ni), as shown in FIG. 3. In this case, the metal matrix may be two or more kinds of alloy matrix. Herein, the matrix may include one or more kinds of metal matrix 13 of copper (Cu), tin (Sn), and nickel (Ni) or carbon.

In this case, the porous metallic sintered body may include copper having a content of about 7 to 20 wt %, tin having a content of about 1 to 7 wt %, nickel having a content of about 0.3 to 4 wt %, and carbon having a content of about 0.2 to 2 wt % with respect to the total weight of the porous metallic sintered body, and in addition, iron may be included by a residual amount so that the total weight of the porous metallic sintered body becomes 100 wt %.

In addition, the porous metallic sintered body may further include a little amount of metal such as boron (B), chromium (Cr), molybdenum (Mo), vanadium (V), tungsten (W), manganese (Mn), and the like. For example, the porous metallic sintered body may further include a single metal or two or more kinds of mixture of metals such as a boron content of about 0.01 to 0.3 wt %, a chromium content of about 0.01 to 0.3 wt %, a molybdenum content of about 0.01 to 0.3 wt %, a vanadium content of about 0.01 to 0.3 wt %, a tungsten content of about 0.01 to 0.3 wt %, a manganese content of about 0.01 to 0.3 wt %, and the like with respect to the total weight of the porous metallic sintered body, but it is not limited thereto.

As shown in FIG. 3, a plurality of pores 11 are formed in the porous metallic sintered body and an average size of the pores is preferably in the range of about 50 to 200 μm. When the average size of the pores is less than about 50 μm, the pores of the contact region is easily closed in a smoothing process of an initial step of abrasion and thereafter, the lubricant may not escape from the pores. Meanwhile, when the average size of the pores is more than about 200 μm, capillary force is insufficient and thus the lubricant that escaped is not well absorbed back in the pores and may be lost.

In addition, the ratio of the pores of which the sizes are larger than 200 μm among the entire pores in the porous metallic sintered body may be preferably about 1 to 5%. In case where the ratio of the pores of which the sizes are larger than 200 μm is less than 1%, the porous metallic sintered body is difficult to be manufactured by a general producing method of the sintered body, and in case where the ratio of the pores of which the sizes are larger than 200 μm is more than 5%, fatigue strength is deteriorated due to stress concentration and thus lifespan of the bush may be deteriorated.

Further, the porosity of the porous metallic sintered body is appropriately about 15 to 25% in consideration of load bearing capacity of the bush.

Figure 4:
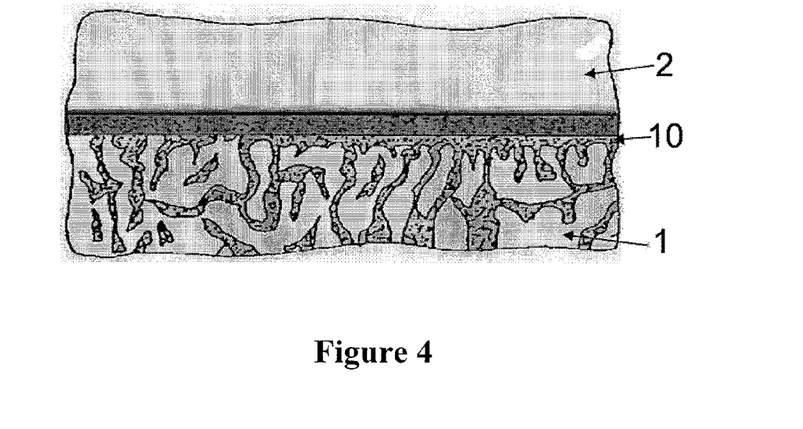
FIG. 4 is a pattern diagram illustrating a sintered bush according to an exemplary embodiment of the present invention.

In the case of the bush 1 including the porous metallic sintered body according to the present invention, as shown in FIG. 4, a lubricant 10 which is semisolid or solid at room temperature is impregnated in the pores of the porous metallic sintered body. However, oil separation rate of the lubricant is 5 to 10% at an operational temperature of 60 to 80° C. If the oil separation rate is less than 5% at an operational temperature of 60 to 80° C., the base oil is not separated from the lubricant well, and thus the flowability of the lubricant is deteriorated and lubricative action may be limited. If the oil separation rate is more than 10% at an operational temperature of 60 to 80° C., the base oil is excessively separated from the lubricant, and thus the flowability of the lubricant is excessive and as a result the lubricant discharged in non-operation is difficult to be restored in the pores and loss of the base oil is accumulated in using for a long time, thereby shortening the lifespan of the bush.

Meanwhile, when the working machine stops, the oil separation rate is preferably 2% or less within a phase-transition temperature range, that is, an operational temperature of 40° C. to 60° C. and ideally, 0%, so that the lubricant of the present invention is restored in the pores without loss of the base oil that escaped to the inner periphery of the sintered bush, thereby preventing the lifespan of the bush from being deteriorated due to the accumulated loss of the base oil. If the oil separation rate in the phase-transition temperature range is larger than 2%, the loss of the base oil is accumulated by repeatedly escaping and restoring of the lubricant, and thus the lifespan of the bush is deteriorated. According to an exemplary embodiment of the present invention, the oil separation rate may be about 1 to 2% at the operational temperature of 40° C. to 60° C.

In addition, the lubricant of the present invention has preferably consistency of NLGI (National Lubricating Grease Institute) level 2 or lower. If the lubricant which is semisolid or solid at room temperature has consistency of higher than NLGI level 2, the lubricant is not smoothly impregnated in the pores and flowability at the operational temperature is deteriorated, thereby deteriorating the lubricative action.

The lubricant includes a wax, a thickener, an additive, and a base oil and preferably, includes a wax, a thickener, an extreme pressure additive, solid lubricative particles, and a base oil so as to be in a semisolid or solid state at room temperature.

The wax used in the present invention, which is material containing a plurality of hydrophobic functional groups in a molecular structure of a irregular chain form having a constant length, has a high affinity with the base oil due to the hydrophobic functional groups.

Examples of the wax are a general wax, a solid polymer wax, and an oil wax. Specifically, the wax includes solid polymer wax such as polyethylene, polyolefin, polyester, epoxide, urethane, or the like; the general wax such as paraffin wax, microcrystal wax, ethylene bisstearamides, cotton seed wax, or the like; the oil wax such as cotton seed oil, soybean oil, jojob oil, triglycerides having $C_{14-24}$ side chain such as blends thereof and the like, and hydride vegetable oil as derivatives thereof, but are not limited thereto.

Since the wax may be swollen when mixed with the base oil at a proper proportion, the lubricant used in the present invention may be maintained in a semisolid state or a solid state at room temperature and as a result the solid lubricative particles are precipitated and cohered at room temperature, and the pores are not closed, thereby performing smoothly the lubricative action. In addition, since the wax may be liquefied at the operational temperature (ex. temperature of about 60 to 80° C.) at the operation time of the working machine, the lubricant of the present invention can give an excellent lubricative characteristic to the inner periphery of the bush. In addition, the wax may serve to absorb the base oil that escaped so that the lubricant, particularly, the base oil may be restored into the pores without loss when the working machine stops.

To this end, in the present invention, it is proper to use wax having weight average molecular weight of 300 to 4000, preferably 300 to 2000. If the weight average molecular weight of the wax is less than 300, the lubricant has excessive flowability in a liquid state so as to be difficult to be restored into the pores when the working machine is stopped and if the weight average molecular weight of the wax is more than 2000, the flowability of the lubricant is limited at a low temperature below room temperature and the base oil is separated from the lubricant resulting in loss of the base oil. For example, in the present invention, in case of the solid polymer wax, the lubricant having weight average molecular weight of about 500 to 2000 may be used and in the case of the general wax such as paraffin and the microcrystal wax, the lubricant having weight average molecular weight of about 300 to 1000 may be used.

Further, in the present invention, the wax of which a softening temperature is about 150° C. or less, and preferably, about 40 to 90° C. may be used. If the softening temperature of the wax is too low, the lubricant may not be maintained in a semisolid state or solid state at room temperature, such that the solid lubricative particles are precipitated and cohered and the pores are closed and as a result, the base oil separated from the lubricant when the working machine is operated does not escape to the inner periphery of the bush, thereby making it impossible to obtain the sliding effect well. Meanwhile, if the softening temperature of the wax is too high, the base oil discharged when the working machine is topped is not restored into the pores well, resulting in accumulated loss of the base oil and deteriorated lifespan of the bush.

The content of the wax may be about 5 to 50 wt %, and preferably, about 5 to 20 wt % with respect to a total weight of the lubricant. If the content of the wax is less than 5 wt %, the lubricant may not be maintained in a semisolid state or solid state at room temperature. Meanwhile, if the content of the wax is more than 50 wt %, the oil separation rate and the flowability are excessive at the operational temperature, and as a result the loss may be large after use for a long time.

The thickener used in the present invention is grouped into a metallic soap thickener, an inorganic non-soap thickener, and an organic non-soap thickener. Examples of the metallic soap thickener are alkali metal, alkali earth metal, amphoteric metal, and the like, examples of the inorganic non-soap thickener are silica gel, bentonite, and the like, and examples of the organic non-soap thickener are urea, sodium telephthalamate, and the like. More particular examples are a Ca-based thickener, a Na-based thickener, an Al-based thickener, a Li-based thickener, a mixed thickener, a Ca-complex thickener, a Li-complex thickener, an Al-complex thickener, silica gel, bentonite, diurea, triurea, tetraurea, sodium telephthalamate, and the like, but are not limited thereto.

The content of the thickener is preferably about 0.5 to 20 wt % with respect to a total weight of the lubricant. If the content of the thickener is less than 0.5 wt %, restoration rate of the base oil oil-separated during the operation is low, such that the loss of the lubricant may be increased during the operation for a long time, and if the content of the thickener is more than 20 wt %, consistency of the lubricant is excessive and as a result, the lubricant is difficult to be impregnated into the pores of the porous metallic sintered body.

Examples of the base oil used in the present invention are mineral oil and synthetic oil, and more particular examples are mineral oils, such as paraffin-based base oil, naphthene-based base oil, and mixed oil and synthetic oils, such as ester-based base oil, polyalphaoleffin (P.A.O)-based base oil, silicone-based oil, fluorine-based base oil, and the like, but are not limited thereto. However, in case where both the mineral oil and the vegetable wax are used together, the base oil and the wax may not be combined depending on the types of hydrophobic functional group of the wax and the base oil and the wax may be separated, and as a result it is preferable to consider types of wax at the time of using the base oil, particularly, types of hydrophobic functional group of the wax.

Viscosity of the base oil is preferably in the range of 50 to 1500 cSt at the temperature of 40° C. If the viscosity of the base oil is less than 50 cSt at the temperature of 40° C., the flowability of the base oil is excessive, such that the base oil is not restored in the pores well, resulting in an increase of loss and load bearing capacity of the oil film being insufficient to deteriorate the abrasion resistance. Meanwhile, if the viscosity of the base oil is more than 1500 cSt at the temperature of 40° C., the flowability of the base oil is too low, such that the base oil does not smoothly move to the inside and outside of the pores and the lubricative effect may not be obtained well in the inner periphery of the bush.

The content of the base oil may be a residual amount adjusted such that the lubricant becomes 100 wt % with respect to a total weight of the lubricant.

In the present invention, in order to more improve performance of the lubricant and satisfy demand performance of a user, various kinds of performance enhancement additives may be added. Examples of the additives are an extreme pressure additive, solid lubricative particles, and the like, and in the present invention, the extreme pressure additive and/or the solid lubricative particles may be included.

The additive may be used in the range of about 0.1 to 5 wt % with respect to a total weight of each lubricant depending on the type of additive. For example, in case where the solid lubricative particles are included in the lubricant of the present invention, if the content of the particles is too small, the extreme pressure characteristic may be insufficient, and if the content of the particles is too large, the particles may be cohered with each other. Therefore, the content of the solid lubricative particles may be preferably in the range of about 1 to 2.5 wt %. Meanwhile, in case where the extreme pressure additive is included in the lubricant of the present invention, if the content of the extreme pressure additive is too small, the extreme pressure characteristic may be insufficient, and if the content of the extreme pressure additive is too large, the extreme pressure characteristic may be deteriorated. Therefore, the content of the extreme pressure additive may be preferably in the range of about 0.1 to 2.0 wt %.

The solid lubricative particles may act as the thickener and at the same time, as the extreme pressure additive under the lubricative condition of high load. Examples of the solid lubricative particles are graphite, graphite fluoride, $MoS_2$, $MoSe_2$, $WS_2$, $WSe_2$, $NbS_2$, $NbSe_2$, TaS, $TaSe_2$, $TiS_2$, $TiSe_2$, $TiTe_2$, $CeF_3$, $Ba(OH)_2$, $CdCl_2$, $CoCl_2$, $ZrCl_2$, $PbCl_2$, $PbI_2$, BN, $Ag_2SO_4$, Borax($Na_2B_4O_7$), Talc($Mg_3(OH)_2Si_2O_{10}$), Mica($KAl_2(Si_3Al)O_{10}(OH)_2$), ZnS, $SnS_2$, FeS, $CaF_2$, LiF, $Zn_2P_2O_7$, $Ca_3(PO_4)_2$, $Fe_2P_2O_7$, $Ca(OH)_2$, $Mg(OH)_2$, $Zn(OH)_2$, PbO, ZnO, FeO, $Fe_2O_3$, $Fe_3O_4$, PTFE, FEP, PFA, PE, PP, PU, PEEK, polyamide, polyacetal, polytetrephthalate, polysiloxane, nylon, phenol-formaldehyde, urea-melamine-formaldehyde, epoxy resin, phenolic resin, unsaturated polyester resin, Pb, Sn, Zn, Cu, Ag, In, and a mixture thereof, but are not limited thereto.

In addition, the extreme pressure additive can prevent abrasion or bake of the friction surface of the bush. Examples of the extreme pressure additive are a chemical additive such as sulfur (S) compounds, phosphorous (P) compounds, sulfur-phosphorous (S—P) compounds, and the like and a metallic extreme pressure additive such as lead (Pb), molybdenum (Mo), and the like.

Meanwhile, the bush according to the present invention may be manufactured by a method including: forming a porous metallic sintered body; forming a lubricant which is semisolid or solid at room temperature; and impregnating the lubricant in pores of the porous metallic sintered body, but is not limited thereto. Herein, a temporal order relationship does not exist between the forming of the porous metallic sintered body and the forming of the lubricant.

1) The porous metallic sintered body of the present invention may be manufactured by various methods. For example, the porous metallic sintered body may be manufactured by a method including: mixing an iron powder with one or more kinds of metal powder selected from copper, nickel, and tin and selectively, a graphite powder; forming a ring-shaped molding body by applying a pressure of about 300 to 5,000 kg/cm² to the mixture; forming a high-strength sintered body by heating the ring-shaped molding body at the temperature of about 1100 to 1150° C. for about 25 to 30 minutes under a vacuum atmosphere, a nitrogen atmosphere, or an inert gas atmosphere such as argon gas; carburized-heating the sintered body at the temperature of 900° C., but is not limited thereto.

Specifically, the ring-shaped molding body (molding body in a bush form) may be formed by applying pressure to the mixture made of an iron powder and one or more kind of metal powder selected from copper, nickel, and tin or the mixture including the graphite powder. In this case, it is preferable to apply pressure of about 300 to 5000 kg/cm² to the mixture so as to obtain a porosity of 15 to 25% in the later-formed sintered body.

Thereafter, the high-strength sintered body is formed by heating the ring-shaped molding body. In this case, in order to prevent the ring-shaped molding body from being oxidized, the heating is performed under a vacuum atmosphere, a nitrogen atmosphere, or an inert gas atmosphere such as argon gas. In addition, a heating temperature of the ring-shaped molding body may be about 1100 to 1150° C., and a heating time may be about 25 to 30 minutes. Accordingly, a metal-based component such as a copper-based component and the like is properly liquefied and combined with an iron-based component so as to form the high-strength sintered body having porosity of about 15 to 25%.

The high-strength sintered body formed as the above is carburized-heated at the temperature of about 900° C. in order to compensate decarburization in the iron-based matrix area of the previous sintering step and increase hardness of the iron-based matrix structure without a change of porosity according to subsequent additional sintering progress. Accordingly, the porous metallic sintered body of the present invention may be formed.

2) Meanwhile, the lubricant of the present invention may be manufactured by a manufacturing method of a general grease known in the related industry field. For example, the lubricant of the present invention may be manufactured by a method including: mixing a wax, a thickener, and a base oil; heating (saponification) the mixture; dispersing (cooling) the heated mixture; lowering a temperature by adding a residual base oil into the cooled mixture so as to have desired consistency; and stirring and milling the mixture after adding various kinds of additives into the mixture having the adjusted consistency, but is not limited thereto.

However, in the present invention, the mixing is preferably performed at the softening temperature of the wax, for example, the temperature of about 150° C. or less so that the wax, the thickener, and the base oil are uniformly mixed.

3) The prepared lubricant which is semisolid or solid at room temperature is impregnated in pores of the porous metallic sintered body prepared as described above.

However, the impregnating of the lubricant is preferably performed under the temperature of about 80 to 100° C. If the impregnating temperature is less than 80° C., the flowability of the lubricant is insufficient, and thus impregnation rate may be deteriorated and the wax component may be impregnated in a separated state. Meanwhile, if the impregnating temperature is more than 100° C., the solid lubricative particles may be precipitated when the working machine is stopped for a long time.

In addition, the impregnating of the lubricant is preferably performed under a pressure of about 0.01 to 0.1 MPa. If the impregnating pressure is more than 0.1 MPa, the impregnation rate of the lubricant may be deteriorated. Meanwhile, if the impregnating pressure is less than 0.01 MPa, the impregnation rate of the lubricant is not largely influenced and an additional high-vacuum equipment is needed, and thus, it is not preferable.

The sintered bush manufactured by the method may be used even under a low speed and a high contact pressure. Particularly, the bush of the present invention may be used even under an extreme condition with a contact pressure of 8 kg/mm² or more exerting on the slide-way with the shaft and a fluctuation velocity of 1 to 8 cm/sec.

Figure 5:
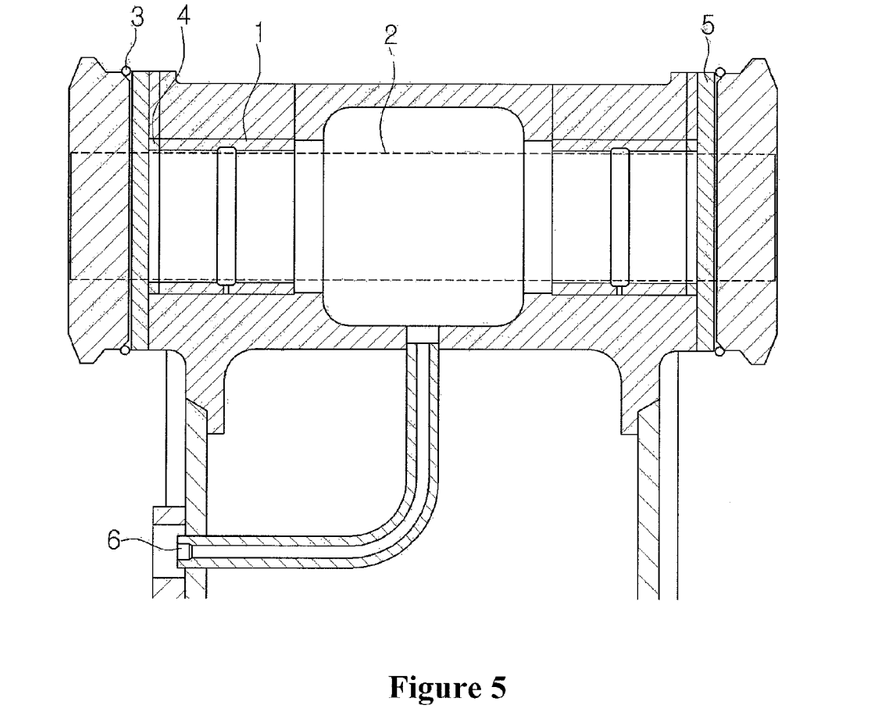
FIG. 5 is a cross-sectional view illustrating a link part applied with a sintered bush according to an exemplary embodiment of the present invention.

The sintered bush 1 of the present invention may have an application to a link part including a pin 2, an O-ring 3, a dust seal 4, an anti-abrasion disk 5, and a feeding hole 6, as shown in FIG. 5, but it is not limited thereto.

Hereinafter, the present invention will be described in more detail through examples and comparative examples. However, the following examples exemplify the present invention and the scope of the present invention is not limited thereto.

Example 1

1-1. Manufacture of Porous Metallic Sintered Body

A copper (Cu) powder of 10 wt %, a $Cu_3OSn$ powder of 10 wt %, a graphite (c) powder of 1 wt %, a nickel (Ni) powder of 1.2 wt %, a boron (B) powder of 0.2 wt %, a silicon (Si) powder of 0.1 wt %, a chrome (Cr) powder of 0.3 wt %, a molybdenum (Mo) powder of 0.3 wt %, a vanadium (V) powder of 0.1 wt %, a tungsten (W) powder of 0.3 wt %, a manganese (Mn) powder of 0.03 wt %, and a residual iron (Fe) powder were mixed by using a stearate-based lubricant (Kenolube P11, Hoganes). A bush-form of molding body having an inner diameter of 70 mm, an outer diameter of 82 mm, and a length of 80 mm was manufactured by applying a pressure of 3000 kg/cm$^2$ to the mixture. Thereafter, the bush-form of molding body was sintered by heating at the temperature of 1100° C. for about 25 minutes in a furnace of nitrogen atmosphere. The sintered bush having an inner diameter of 71 mm, an outer diameter of 80 mm, and a length of 80 mm was acquired by mechanically processing the porous metallic sintered body acquired by carburized-heating the formed sintered body at the temperature of 900° C.

1-2. Manufacture of Lubricant

A paraffin wax of 20 wt % (melting point: 56° C., weight average molecular weight: 500), a paraffin-based mineral oil of 66 wt % (kinematic viscosity of 40° C.: 240 cSt), and a Li-based thickener of 10 wt % were mixed and thereafter, heated and stirred in a saponification tank at the temperature of 200° C. for about 6 hours. Herein, a phosphate-based extreme pressure additive (ZDDP) of 2 wt % and MoS$_2$ of 2 wt % (average particle-size: 5 μm) were added. Thereafter, after the mixture was heated, stirred, dehydrated, and dispersed at the temperature of 200° C. for about 12 hours, the mixture was slowly cooled up to room temperature at a cooling velocity of 5° C. per minute and gelated. Thereafter, a uniform semisolid lubricant having a NLGI consistency level 00 was acquired by milling and homogenizing using a roll mill for 6 hours.

1-3. Impregnation of Lubricant

Figure 2:
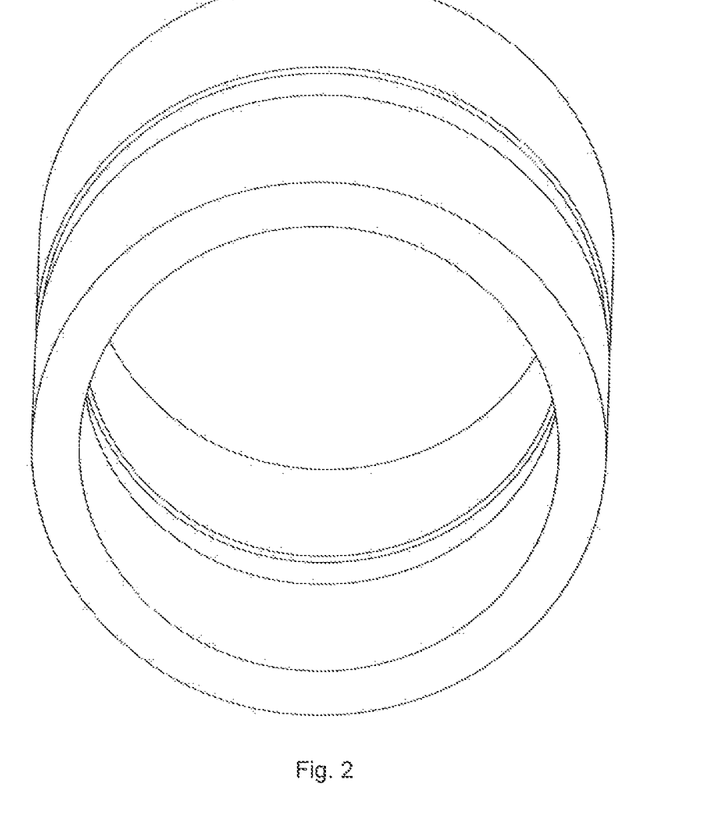
FIG. 2 is a photograph illustrating a sintered bush according to an exemplary embodiment of the present invention.

The sintered bush was manufactured by impregnating the lubricant manufactured in example 1-2 in the porous metallic sintered body manufactured in example 1-1 under the temperature of about 80° C. and the pressure of 0.1 MPa (see FIG. 2)

Example 2 and Comparative Examples 1 to 4

As shown in the following Table 1, the lubricant and the bush using the lubricant were manufactured by the same method as example 1-2, except that a content of paraffin wax, viscosity and a content of base oil, a content of thickener, a content of extreme pressure additive, and a content of solid lubricative particles (MoS$_2$) were changed.

TABLE 1

| | Content of paraffin wax (wt %) | Viscosity of base oil (cSt) | Content of base oil (wt %) | Content of thickener (wt %) | Content of extreme pressure additive (wt %) | Content of MoS$_2$ (wt %) |
|---|---|---|---|---|---|---|
| Example 2 | 20 | 240 | 56 | 20 | 2 | 2 |
| Comparative example 1 | 20 | 460 | 76 | — | 2 | 2 |
| Comparative example 2 | — | 240 | Bal. | — | 1 | — |
| Comparative example 3 | — | 240 | Bal. | — | 2 | — |
| Comparative example 4 | — | 240 | Bal. | — | 2 | 2 |

Experimental Example 1

Lubrication Performance Test

In order to verifying lubrication performance of a bush according to the present invention, extreme pressure property, abrasion resistance, and seizure cycle were measured as below and the measured result was shown in the following Table 2.

1) 4-ball extreme pressure test: The extreme pressure property of the lubricant manufactured in examples 1 and 2 was tested according to ASTM D2783. Here, the lubricant manufactured in comparative examples 1 to 4 was used as a control group.

2) 4-ball wear test: The abrasion resistance of the lubricant manufactured in examples 1 and 2 was tested according to ASTM D4172. Here, the lubricant manufactured in comparative examples 1 to 4 was used as a control group.

3) Seizure cycle measurement: With respect to the bush manufactured in examples 1 and 2, by a method reoperating after break for 1 hour or more every 10000 cycle and then cooling down to room temperature under the condition of fluctuation angle of 90°, fluctuation velocity of 1 m/min, and load of 1 ton-21 ton-1 ton, an initial cycle where an lubricative film formed in the inner periphery of the bush is broken and frictional coefficient is 0.35 or more was measured. Here, the bush manufactured in comparative examples 1 to 4 was used as a control group.

TABLE 2

| | 4-Ball | | Seizure cycle |
|---|---|---|---|
| | EP(kg) | Wear(mm) | |
| Example 1 | 620 | 0.395 | 302,000 |
| Example 2 | 620 | 0.398 | 290,000 |
| Comparative example 1 | 620 | 0.396 | 255,000 |
| Comparative example 2 | 250 | 0.419 | 177,000 |
| Comparative example 3 | 315 | 0.429 | 210,000 |
| Comparative example 4 | 500 | 0.406 | 252,000 |

As a result of the measurement, the bush manufactured in examples 1 and 2 had excellent EP property of the lubricant and excellent abrasion resistance and in addition, had an excellent seizure cycle, as compared with the bush (in which the liquid lubricant is impregnated in the pores) manufactured in comparative examples 1 to 4.

Therefore, in the case of the bush according to the present invention, excellent lubricative effect can be obtained in the inner periphery and the lifespan is not deteriorated.

Experimental Example 2

Measurement of Oil Separation Rate

In order to verify that the lubricant of the present invention has oil separation rate of 5 to 10% at the temperature of 60 to 80° C. and oil separation rate of 2% at the temperature of 40° C. to 60° C., oil separation rate for each temperature of the lubricant manufactured in examples 1 and 2, and comparative example 1 was measured in accordance with KS M 2050. The measured result was shown in FIG. 1.

Figure 1:
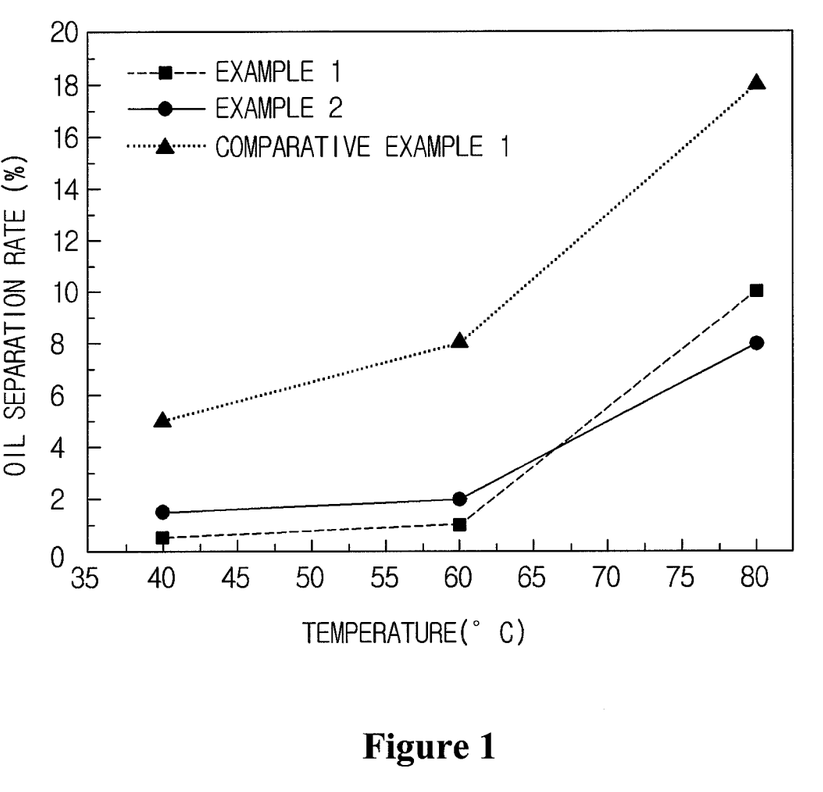
FIG. 1 is a graph illustrating oil separation rate at a respective temperature of a lubricant manufactured in Examples 1 and 2 and Comparative example 1.

In the case of the lubricant manufactured in comparative example 1, oil separation rate at the temperature of 60 to 80° C. as the operational temperature was in the range of about 10 to 18%, and particularly, oil separation rate at the temperature of about 70° C. was as high as about 13%. On the other hand, in the case of the lubricant manufactured in examples 1 and 2, oil separation rate at the temperature of 60 to 80° C. as the operational temperature was in the range of about 2 to 10%, and particularly, oil separation rate at the temperature of about 70° C. was as low as about 5%.

Meanwhile, in the case of the lubricant manufactured in comparative example 1, oil separation rate at the temperature of 40° C. to 60° C. as the stop temperature of the working machine was in the range of about 5 to 8%, while in the case of the lubricant manufactured in examples 1 and 2, oil separation rate at the temperature of 40° C. to 60° C. as the stop temperature of the working machine was about 2% or less.

In addition, as a result of measuring whether or not the base oil leaks to the outside of a pin-bush interface after testing, the leakage of the base oil was observed in the bush using the lubricant of comparative example 1, while the leakage of the base oil was not observed in the bush using the lubricant of examples 1 and 2.

Therefore, since the bush according to the present invention uses the lubricant having oil separation rate of 5 to 10% at the temperature of 60 to 80° C., a suitable amount of base oil is discharged when the working machine is operated so as to yield excellent sliding effect and the base oil discharged when the working machine is stopped is restored in the pores without loss.

The invention claimed is:

1. A sintered bush made of porous metallic sintered body, wherein the porous metallic sintered body comprises:
   an iron (Fe) based matrix containing a martensite structure; and metal matrix of copper (Cu), tin (Sn), nickel (Ni), and carbon,
   wherein the sintered bush is used under a contact pressure of 8 kg/mm$^2$ or more and a fluctuation velocity of the range of 1 to 8 cm/sec,
   wherein a lubricant is impregnated in pores of the porous sintered body, the lubricant having an oil separation rate of 5 to 10 wt % at an operational temperature of 70 to 80 degrees Celsius,
   wherein the lubricant includes a wax of 20 wt %, a thickener of 10 to 20 wt %, an additive of 2 wt %, and a residual amount of base oil and being semisolid or solid at room temperature,
   wherein the wax has a softening temperature of 150 degrees Celsius or less and a weight average molecular weight of 300 to 4000.

2. A sintered bush made of porous metallic sintered body, wherein the porous metallic sintered body comprises: an iron (Fe) based matrix containing a martensite structure; and metal matrix of copper (Cu), tin (Sn), nickel (Ni) and carbon,
   wherein the sintered bush is used under a contact pressure of 8 kg/mm$^2$ or more and a fluctuation velocity of the range of 1 to 8 cm/sec;
   wherein a lubricant is impregnated in pores of the porous sintered body, the lubricant having an oil separation rate of 2 wt % or less at an operational temperature of 40 to 80 degrees Celsius,
   wherein the lubricant includes a wax of 20 wt %, a thickener of 10 to 20 wt %, an additive of 2 wt %, and a residual amount of base oil and being semisolid or solid at room temperature,
   wherein the wax has a softening temperature of 150 degrees Celsius or less and a weight average molecular weight of 300 to 4000,
   wherein a lubricant is impregnated in the pores of the porous sintered body, the lubricant having an oil separation rate of 5 to 10 wt % at an operational temperature of 70 to 80 degrees Celsius.

3. The sintered bush according to claim 1, wherein the lubricant has consistency of NLGI level 2 or less.

4. The sintered bush according to claim 1, wherein the pores have an average size of 50 to 200 μm and porosity of 15 to 25%, and a ratio of the pores of which the size is more than 200 μm among the entire pores is 1 to 5% or less.

5. The sintered bush according to claim 1, wherein the additive comprises an extreme pressure additive, solid lubricative particles, or both the extreme pressure additive and the solid lubricative particles.

6. The sintered bush according to claim 1, wherein the base oil has kinematic viscosity in the range of 50 to 1500 cSt at a temperature of 40 degrees Celsius.

7. The sintered bush according to claim 1, wherein the copper has a content of 7 to 20 wt %, tin has a content of 1 to 7 wt %, nickel has a content of 0.3 to 4 wt %, and carbon has a content of 0.2 to 2 wt % with respect to the total weight of the porous metallic sintered body.

8. The sintered bush according to claim 1 further comprise one or more kinds of mixture of metals selected from boron (B), chromium (Cr), molybdenum (Mo), vanadium (V), tungsten (W), and manganese (Mn).

9. The sintered bush according to claim 1, wherein the wax comprises one of a solid polymer wax and a general wax,
   wherein the solid polymer wax has weight average molecular weight of 500~2000 and the general wax has weight average molecular weight of 300~1000.

10. The sintered bush according to claim 9, wherein the solid polymer wax comprises at least one of polyethylene, polyolefin, polyester, epoxide, and urethane, and the general wax comprises at least one of paraffin wax, microcrystal wax, ethylene bisstearamides, and cotton seed wax.

* * * * *